United States Patent Office 3,340,193
Patented Sept. 5, 1967

3,340,193
MINERAL OIL CONTAINING ALKYL POLY-
METHACRYLATE ANTIFOAMANT
Joseph E. Fields and Edward H. Mottus, St. Louis, Mo.,
assignors to Monsanto Company, St. Louis, Mo., a corporation of Delaware
No Drawing. Original application Dec. 30, 1960, Ser. No. 79,499, now Patent No. 3,269,993, dated Aug. 30, 1966. Divided and this application Jan. 21, 1966, Ser. No. 522,023
7 Claims. (Cl. 252—56)

This application is a division of my copending application Ser. No. 79,499, filed Dec. 30, 1960, now United States Patent No. 3,269,993.

The invention relates to new methacrylate antifoamants and to mineral oil compositions containing the same.

Conventional acrylate and methacrylate polymers are described in detail in U.S. 2,091,627. These conventional polymers are described to be especially useful for improving the viscosity-temperature coefficient of lubricating oils. The conventional polymers are made by peroxide or ozonide catalysis at 70°–100° C. Recently methods of making certain stereospecific polymers have been discovered and reported; for example, a paper was presented at the April 1959 meeting of the American Chemical Society, Division of Paint, Plastics and Printing Ink Chemistry titled, "Stereospecific Anionic Polymerization of Methyl Methacrylate," by W. E. Goode et al. This paper is reported in the division's preprints on pages 135–140. Syndiotactic, isotactic, block polymers and conventional polymers are described in this paper.

It has now been discovered how to make polymethacrylate antifoamants. Poly(methyl methacrylate) is not useful as an antifoamant in conventional or in any stereo form. Also, it has been discovered that conventional polymers of longer chain alkyl methacrylate are not good antifoamants. It has further been determined that syndiotactic longer chain alkyl polymethacrylates are not good antifoamants. Very surprisingly, it has been found that isotactic alkyl polymethacrylate wherein the alkyl group has from 3 to about 14 carbon atoms are very good antifoamants. Methacrylates, in general have good hydrolysis stability, superior, for example, to acrylates, and this good hydrolysis stability is an especially desirable characteristic for their antifoamant use.

It is an object of this invention to provide new polymers useful as antifoamant additives.

It is another object of this invention to provide new mineral oil compositions having low foaming tendencies.

These and other objects of the invention will become apparent as the detailed description of the invention proceeds.

The new antifoamant polymer additives of the invention are isotactic type polymers. They can be made by homoploymerizing $C_3$ to about $C_{14}$ preferably $C_4$ to about $C_{12}$ alkyl methacrylates, or by copolymerizing $C_8$-$C_{20}$ alkyl methacrylates with methyl methacrylate or other (up to $C_6$) alkyl methacrylates to give polymers averaging $C_3$ to about $C_{14}$ alkyl groups, preferably $C_4$ to about $C_{12}$, using anionic-initiated polymerization; for example, Grignard-initiated polymerization. Suitable monomers useful for making the homopolymers and copolymers of the invention can be selected from the following illustrative but non-limiting list: methyl methacrylate, ethyl methacrylate, n-propyl methacrylate, isopropyl methacrylate, n-butyl methacrylate, isobutyl methacrylate, t-butyl methacrylate, n-amyl methacrylate, isoamyl methacrylate, n-hexyl methacrylate, n-heptyl methacrylate, 2-ethylhexyl methacrylate, n-nonyl methacrylate, n-decyl methacrylate, "Lorol" methacrylate, oxotridecyl methacrylate, lauryl methacrylate, tallow methacrylate, etc. "Lorol" methacrylate is a mixture of methacrylates made by esterifying methacrylic acid with a mixture of 3%–$C_{10}$, 61%–$C_{12}$, 23%–$C_{14}$, 11%–$C_{16}$ and 2%–$C_{18}$ straight-chain alkyl alcohols.

The polymers of the invention are effective antifoaming agents when they are employed in very low proportion, i.e. in amounts of less than 0.1% by weight based on the weight of the total hydrocarbon oil compositions. From 0.001% to 0.05% of the polymers is preferred but can be varied depending on the nature of the oil. Heavy oils and oils containing foam-inducing adjuvants require more of the polymer than do base oils with lesser foaming characteristics. In addition to being employed in mineral lubricating oils per se as antifoamants, the methacrylate polymers of the invention can be employed with compounded oils generally, such as hydrocarbon oils containing additives such as viscosity index improvers, pour-point depressants, detergents, metal deactivators, antioxidants, or extreme pressure agents, e.g. with phosphate-containing gear oils, corrosion-inhabited turbine oils, etc. In addition to being useful antifoamants for mineral lubricating oils, the isotactic polymers of the invention are useful antifoamants for hydraulic oils, automatic transmission oils, furnace oils, disel oils and the like, i.e. mineral oils in general.

The invention is further illustrated but not limited by the following examples:

*Example 1*

This example describes the preparation of a conventional lauryl methacrylate/methyl methacrylate copolymer 72/28 molar ratio to be used for comparison with an isotactic polymer of the invention as to antifoamant property. To a "Coke" bottle was charged 10 g. of lauryl methacrylate, 1.5 g. of methyl methacrylate, 0.0025 g. of azobisisobutylronitrile catalyst and 12.5 g. of toluene solvent. The "Coke" bottle was then capped and agitated in a rotating air oven maintained at a temperature of 68° C. for 48 hours. The crude polymer product was purified by three separate precipitations from methanol with the polymer being dissolved in hot benzene between methanol precipitation. The purified polymer was dried at 45–50° C. in a vacuum oven overnight. Dried polymer yield was 10.9 g. A sample of this polymer was submitted for elemental analysis yielding the following results.

Found: C, 73.7%; H, 11.2%. Calc'd.: C, 73.5%; H, 11.4%.

*Example 2*

This example describes the preparation of a syndioactic lauryl methacrylate/methyl methacrylate copolymer of 72/28 molar ratio for comparison with an isotactic polymer of the invention. To a glass reaction vessel was added 20 g. of lauryl methacrylate, 3 g. of methyl methacrylate and 0.32 ml. of triethyl boron (2 mole percent). The reactants were mixed under nitrogen and cooled to ice bath temperature. Then the nitrogen was displaced with air and the reactants were allowed to react for 44 hours with occasional stirring of the reaction mixture during the first three hours. The polymer was purified by three separate precipitations from methanol with the polymer being dissolved in hot benzene between methanol precipitations.

Then the purified polymer was dried at 50° C. in a vacuum oven overnight. Dry weight of the polymer was 22.6 g. The syndiotacticity of the product was verified by infrared analysis. An elemental analysis of this purified polymer yielded the following results.

Found: C, 73.9%; H, 11.7%. Calc'd.: C, 73.5%; H, 11.4%.

*Example 3*

This example describes the preparation of an isotactic lauryl methacrylate/methyl methacrylate copolymer of the invention having a molar ratio of 72/28. To a 500 ml. four necked flask fitted with nitrogen inlet and outlet stirrer, dropping funnel and thermometer was added 200 ml. of toluene. The toluene and monomer mixture were separately bubbled with nitrogen for one hour and cooled to 5° C. The Grignard reagent consisting of 2.4 ml. of 3 molar phenyl-magnesiumbromide in diethyl ether was added to the toluene. The monomer mixture, 20 g. of lauryl methacrylate and 3 g. of methyl methacrylate, was added dropwise to the reaction vessel over a period of 26 minutes at such a rate as to keep the temperature of the reactants below 5° C. The reactants were stirred for three hours at 2° C. then poured into methanol. The precipitated polymer was dissolved in hot benzene and precipitated in methanol. This benzene-methanol precipitation treatment was repeated two more times. The recovered purified polymer was dried under vacuum overnight giving a yield of 10.5 g. of dried polymer. The isotacticity of this polymer was verified by infrared analysis.

*Example 4*

This example describes the preparation of an isotactic poly(n-octyl methacrylate) of the invention. The same type of apparatus used in Example 3 was used in this example. To the reaction flask was added 150 ml. of toluene which was cooled to 5° C. under nitrogen. Then 2 ml. of three molar phenylmagnesiumbromide in diethyl ether was added to the toluene. The temperature of the reaction mixture was maintained between about 3° C. and 5° C. while 17.87 g. of n-octyl methacrylate was added over a period of 10 minutes. The reaction mixture was stirred for 5½ hours, then left overnight before the work-up of the polymer. The polymer was precipitated from the reaction mixture by the addition of methanol, dissolved in hot benzene and reprecipitated from methanol, repeating the benzene-methanol precipitation two more times. Purified polymer was dried in a vacuum oven at 50° C. overnight giving a 5.4 g. yield of dried polymer. The isotacticity of this polymer was verified by infrared analysis.

*Example 5*

This example describes the preparation of an isotactic poly(n-butyl methacrylate) of the invention. The same procedure as was used for Example 4 was used in this example except as described below. The charge to the reactor was 200 ml. of dry toluene, 23 g. of butyl methacrylate and 4 ml. of 3 molar phenylmagnesiumbromide in diethyl ether. The monomer was added to the catalyst and toluene over a period of 19 minutes and the reaction mixture was stirred at ice bath temperature for 3 hours before being left overnight. The polymer was purified and dried in the same manner as in Example 4 and the yield of purified dried polymer was 4.2 g.

*Example 6*

This example describes the preparation of another isotactic poly(n-butyl methacrylate) of the invention. The procedure used in this example was the same as used in Example 5 except as described below. The charge to the reactor was 200 ml. of toluene, 21.9 g. of n-butyl methacrylate and 5.2 ml. of 3 molar ethylmagnesiumbromide in diethyl ether. Addition of the monomer to the catalyst and toluene took 27 minutes. The polymerization time was 1½ hours after which time the reaction mixture was poured into methanol and the recovered polymer purified and dried as described in Example 4. Yield of purified dried polymer was 4.7 g.

*Example 7*

This example describes the preparation of a conventional poly(n-octyl methacrylate) for comparison with the corresponding isotactic polymer of the invention. To a "Coke" bottle was charged 19.8 g. of n-octyl methacrylate, 0.025 g. of azobisisobutyronitrile catalyst and 100 ml. of benzene. The "Coke" bottle was then stoppered and inserted into a tumbling air oven for 5 days at 70° C. The reaction mixture was treated with methanol to precipitate the polymer and the polymer was purified in the conventional manner as described in other examples above. The yield of purified polymer was 15.6 g.

*Example 8*

This example describes the preparation of a conventional poly(n-butyl methacrylate) for comparison with the corresponding isotactic methacrylate of the invention. This example was carried out in a fashion similar to Example 7. The charge to the reactor was 14.2 g. of n-butyl methacrylate, 0.025 g. of azobisisobutyronitrile catalyst and 100 ml. of benzene. The yield of purified polymer was 8.4 g.

*Example 9*

This example describes the preparation of a conventional poly(2-ethylhexyl methacrylate) for comparison with isotactic polymers of the invention. This experiment was carried out in a fashion similar to Example 7. The charge to the reactor was 19.8 g. of 2-ethylhexyl methacrylate, 0.025 g. of azobisisobutyronitrile catalyst and 100 ml. of benzene. The yield of purified polymer was 18.2 g.

*Example 10*

This example describes the preparation of an isotactic poly(n-amyl methacrylate) of the invention. This experiment was carried out in a manner similar to that described in Example 3. 200 ml. of toluene and 3 ml. of 3 molar phenylmagnesiumbromide in diethyl ether were charged to the reaction flask. Nitrogen blanketing was used and the toluene and catalysts were cooled to 1° C. Over a period of 22 minutes, 16.5 g. of n-amyl methacrylate was added to the catalyst and toluene maintaining the temperature between 3° and 5° C. The reaction mixture was stirred at 0° C. for 4 hours, then the polymer was precipitated in methanol. The recovered polymer was dissolved in hot benzene and reprecipitated in methanol. This benzene and methanol treatment was repeated two more times to purify the polymer. The purified polymer was dried in a vacuum oven at 50° C. overnight resulting in 6.4 g. of dry polymer.

*Example 11*

This example describes the preparation of a poly(n-hexyl methacrylate) of the invention. This experiment was carried out in a manner similar to Example 10. The charge to the reactor was 200 ml. of toluene, 14.7 g. of n-hexyl methacrylate and 2.8 ml. of 3 molar phenylmagnesuimbromide in diethyl ether. Addition of the monomer to the toluene and catalysts was completed in 11 minutes. As in Example 10 the reaction time was 4 hours. The polymer was recovered, purified and dried in a similar manner to that described for polymer of Example 10. The dry weight yield of purified polymer was 7.6 g.

*Example 12*

This example describes the preparation of a lauryl methacrylate polymer of the invention. The toluene and the monomer used in this example were purged by bubbling with nitrogen for 1½ hours. Similar apparatus and procedure was used as had been used in Example 3. To the flask was charged 150 ml. of toluene (dried over sodium)

and 2 ml. of 3 molar phenylmagnesiumbromide in diethyl ether. The flask and contents were cooled and when the temperature had dropped to 3° C. addition of 20.5 g. of lauryl methacrylate was started. The temperature was kept by cooling between 3° and 5° C. and the addition of the monomer was complete in 44 minutes. Stirring of the reactants was continued for a period of 2 hours after which time the reaction mixture was poured into methanol causing precipitation of a gummy polymer mass. The crude polymer recovered from the methanol was added to benzene and heated. Some difficulty was encountered in putting the polymer in solution in hot benzene, but this was finally accomplished. The polymer was then precipitated with methanol and washed with methanol. The procedure of dissolving in hot benzene and precipitating from methanol was repeated 3 more times to purify the polymer. The purified polymer was dried in a vacuum oven overnight at 40° C., and 11.5 g. of dried polymer were recovered. The isotaticity of this polymer was verified by infrared analysis.

Example 13

This example describes the preparation of an isotactic methyl methacrylate polymer. A sample of 900 ml. of purified toluene which had been bubbled with nitrogen to remove trapped oxygen for 1 hour was added to a 2 liter, four-necked, round-bottom flask. The toluene was cooled to 1° C. using an ice bath and 10 ml. of 3 molar, phenylmagnesiumbromide was added to the toluene. Then the addition of 50 g. of methyl methacrylate monomer which had been nitrogen-bubbled like the toluene, was begun dropwise with agitation of the reaction mixture. The methyl methacrylate was added slowly to keep the temperature below 5° C. and nitrogen blanketing was used during the entire procedure. The addition of the monomer was completed in 22 minutes. Polymerization was continued for an additional 5 hours and 20 minutes at ice bath temperature. At the end of this time the reaction mixture was poured into 6 liters of pentane with vigorous stirring. The polymer precipitated and was washed with additional pentane. The recovered purified polymer was dried overnight in a vacuum oven at 45° C. to give a 49.4 g. yield of dried purified polymer. The isotacticity of this polymer was verified by infrared analysis.

Example 14

This example describes the preparation of an isotactic polymer from tallow methacrylate which is a mixture of about 33% by weight of $C_{16}$ and about 67% by weight of $C_{18}$ straight-chain alkyl methacrylates. Similar apparatus and procedure was used as was used in Example 3. To the reaction vessel was charged 200 ml. of toluene at 0° C. and nitrogen blanketing was applied. To this toluene in the reaction vessel was added the Grignard catalyst which was 3 ml. of 3 molar phenylmagnesiumbromide in diethyl ether. The tallow methacrylate monomer was purified by percolation over alumina to remove polymerization inhibitor and a sample of this purified material 31.2 g. was added to the reaction vessel over a 24 minute period at a rate to keep the temperature between 0°–5° C. After 4 hours during which time the reaction mixture was maintained at about 0° C. the reaction mixture was poured into methanol. The crude polymer was recovered from the methanol, dissolved in benzene and precipitated from methanol with this dissolving and precipitation procedure being repeated two more times. The purified polymer was then dried in a vacuum oven for 58 hours. Yield of dried polymer was 22.8 g.

Example 15

This example describes the preparation of a polymer of the invention prepared from a 50/50 molar ratio of lauryl methacrylate and methyl methacrylate. Similar apparatus and procedure was used as was used in Example 3. The mixture of monomers was added to the Grignard catalyst over a period of 28 minutes at 4° C. This mixture of monomers was added to the Grignard catalyst over a period of 28 minutes at 4° C. This mixture of monomers consisted of 5 g. of methyl methacrylate and 12.7 g. of lauryl methacrylate. The catalyst 2 ml. of 3 molar phenylmagnesiumbromide in diethyl ether was added to 200 ml. of toluene prior to the addition of the monomers thereto. The reaction mixture quickly set up to a jell. After three hours at reaction temperature of about 4° to 5° C. the polymer was precipitated in methanol. The recovered crude polymer was dissolved in benzene and precipitated from methanol in 3 additional purification steps. The purified polymer was dried overnight in a vacuum oven at 48° C. resulting in a yield of 9.5 g.

Example 16

This example describes the preparation of a conventionl poly-(lauryl methacrylate). To a "Coke" bottle were charged 50 g. of lauryl methacrylate, 58 g. of benzene and 0.029 g. of azobisisobutyronitrile catalyst. The "Coke" bottle was capped and agitated in an air oven at 68° C. for 60 hours. At the end of this time the reaction mixture was poured into methanol to precipitate a gummy polymer. The precipitated polymer was dissolved in benzene and again precipitated from methanol. This purification procedure was repeated 2 more times. The purified polymer was then dried in a vacuum oven overnight yielding 48.7 g. of purified dried polymer.

Example 17

This example describes the preparation of a conventional polymer from a mixture of n-octyl methacrylate and methyl methacrylate in 77/23 molar ratio. To a "Coke" bottle was added 17.5 g. of n-octyl methacrylate, 2.5 g. of methyl methacrylate, 0.025 g. of azobisisobutyronitrile catalyst and 100 ml. of benzene. The "Coke" bottle was capped and agitated for 5 days in an air oven at 70° C. At the end of this polymerization time the polymer was purified by the usual repeated dissolving in benzene and precipitating from methanol. Yield of polymer was 16.9 g.

Example 18

This example describes the preparation of a conventional methyl methacrylate polymer. To a "Coke" bottle was added 30 g. of methyl methacrylate freshly distilled, 100 cc. of carbon tetrachloride and 1.5 g. of benzoyl peroxide. The "Coke" bottle was capped and heated at 95° for 48 hours agitating in an air oven at 43 r.p.m. The reaction mixture was diluted to ten percent solids (based on reaction of monomer) with carbon tetrachloride and used directly for antifoamant evaluation.

Table I below is a summary of the polymerization experiments and the characteristics of the polymers produced in the examples. The type of polymer, i.e. isotactic, conventional or syndiotactic has been determined from the method by which the polymer was made and for some of the examples has been verified by infrared analysis. Others working with poly(methyl methacrylate) and using nuclear magnetic resonance studies confirm our polymer type designation such as that of Example 13. The conventional polymers are syndiotactic but the term conventional has been used to distinguish from polymers called syndiotactic which have appreciably higher relative syndiotacticity as indicated by infrared and differential infrared analysis. For a more detailed discussion of this situation reference is made to copending application Ser. No. 79,671, filed Dec. 30, 1960, now United States Patent No. 3,252,949. In this copending application FIGURE 3 relative syndiotacticity is defined from differential infrared values for two different types of polymers. This curve also defines relative isotacticity if one reads 0 relative syndiotacticity as 100 relative isotacticity and 100 relative syndiotacticity as a relative isotacticity of 0 which they are by definition. Preferred polymers of the invention have greater than 60 relative isotacticity, more preferably greater than 80 relative isotacticity.

TABLE I

| Ex. No. | Methacrylate Monomers[1] | Monomer, Mole Ratio | Type of Polymer | Sp. Visc.[2] at 25° C. |
|---|---|---|---|---|
| 1 | LM/MM | 72/28 | Conventional | 1.429 |
| 2 | LM/MM | 72/28 | Syndiotactic | 1.920 |
| 3 | LM/MM | 72/28 | Isotactic | 1.572 |
| 4 | n-octyl | | do | 0.817 |
| 5 | n-butyl | | do | 5.137 |
| 6 | do | | do | 1.669 |
| 7 | n-octyl | | Conventional | 0.505 |
| 8 | n-butyl | | do | 0.533 |
| 9 | 2-ethylhexyl | | do | 0.506 |
| 10 | n-amyl | | Isotactic | 1.294 |
| 11 | n-hexyl | | do | 0.292 |
| 12 | LM | | do | |
| 13 | MM | | do | (³) |
| 14 | Tallow | | do | 0.315 |
| 15 | LM/MM | 50/50 | do | 4.169 |
| 16 | LM | | Conventional | 1.761 |
| 17 | n-octyl/MM | 87.5/12.5 | do | 0.493 |
| 18 | MM | | do | |

[1] LM—Lauryl methacrylate; MM—Methyl methacrylate.
[2] Determined for 1% polymer in benzene.
[3] Partly insoluble.

The anti-foam testing of isotactic polymers of the invention as compared with syndiotactic and conventional polymethacrylate is summarized in Table II below. In the tests 30 ml. of the oil composition being tested is added to a 100 ml. graduate. Nitrogen is bubbled through the oil sample at 0.2 cubic feet per hour from a sintered glass bubbling tube for 5 minutes. At the end of this 5 minute period the volume of foam in milliliters is taken as a measure of the anti-foam activity. The base oil used was a solvent refined Mid-Continent petroleum oil having the following properties:

Viscosity at 210° F., centistokes _____ 10.39
Viscosity at 100° F., centistokes _____ 91.73
Flash point, Cleveland open cup, ° F. _____ 450
Viscosity Index _____ 103.4 preferably not more than about 10% by weight based on the mixture with the methacrylate monomers.

Although the invention has been described in terms of specified embodiments which are set forth in considerable detail, it should be understood that this is by way of illustration only and that the invention is not necessarily limited thereto since alternative embodiments and operating techniques will become apparent to those skilled in the art in view of the disclosure. Accordingly, modifications are contemplated which can be made without departing from the spirit of the described invention.

Having thus described our invention, what we desire to claim and secure by Letters Patent is:

1. A mineral oil composition having low foaming characteristics comprising a major portion of mineral oil and at least an amount sufficient to substantially reduce foaming in said oil but less than 0.1% by weight based on said composition of isotactic alkyl polymethacrylate having an average in the range of 3 to about 14 carbon atoms in the alkyl group and a specific viscosity at 25° C. and 1% concentration in benzene in the range of 0.2 to 10.0.

2. A mineral oil composition having low foaming characteristics comprising a major portion of mineral oil and at least an amount sufficient to substantially reduce foaming in said oil but less than 0.1% by weight based on said composition of isotactic alkyl polymethacrylate having an average in the range of 4 to about 12 carbon atoms in the alkyl group and a specific viscosity at 25° C. and 1% concentration in benzene in the range of about 0.5 to about 6.0.

3. A composition of claim 2 wherein said polymethacrylate is poly(n-butyl methacrylate).

4. A composition of claim 2 wherein said polymethacrylate is poly(n-amyl methacrylate).

5. A composition of claim 2 wherein said polymethacrylate is poly(lauryl methacrylate).

TABLE II

| Example No. | Methacrylate Monomer[1] | Average Alkyl Chain Length | Type of Polymer | Foam volume in milliliters at various polymer concentrations[2] | | | | |
|---|---|---|---|---|---|---|---|---|
| | | | | 500 p.p.m. | 300 p.p.m. | 200 p.p.m. | 100 p.p.m. | 50 p.p.m. |
| 14 | Tallow | 17.3 | Isotactic | 40 | | 45 | | 55 |
| 12 | Lauryl | 12.0 | do | | | NF | 10 | 25 |
| 16 | do | 12.0 | Conventional | 50 | | 55 | | 55 |
| 3 | LM/MM | 8.9 | Isotactic | | | NF | | B |
| 1 | LM/MM | 8.9 | Conventional | | | 25 | | 25 |
| 2 | LM/MM | 8.9 | Syndiotactic | | | 30 | | 30 |
| 4 | n-octyl | 8.0 | Isotactic | | | NF | 5 | 15 |
| 7 | do | 8.0 | Conventional | | | 20 (400) | 20 | 20 |
| 9 | 2-ethylhexyl | 8.0 | do | | | 50 (400) | | |
| 17 | n-octyl/MM | 7.1 | do | 45 | | 50 | | 55 |
| 15 | LM/MM | 6.5 | Isotactic | | | NF (150) | | 10 |
| 11 | n-hexyl | 6.0 | do | 10 | 15 | 20 | | 40 |
| 10 | n-amyl | 5.0 | do | B | 10 | 20 (150) | | 30 |
| 5 | n-butyl | 4.0 | do | | | NF | B | |
| 6 | do | 4.0 | do | | | B | NF | |
| 8 | do | 4.0 | Conventional | 40 (550) | 50 (350) | 50 (150) | | 40 |
| 13 | Methyl | 1.0 | Isotactic | 60 | | | | 60 |
| 18 | Methyl | 1.0 | Conventional | 50 (1,000) | | | | |
| | Base oil | | | >50 | | | | |

[1] LM means lauryl methacrylate; MM means methyl methacrylate.
[2] NF means no foam; B means large bubbles; designation such as 20 (150) means 20 ml. of foam at 150 p.p.m. polymer concentration in oil.

It is seen from an examination of the data of Table II that the isotactic polymers of the invention are effective antifoamants; whereas, the corresponding conventional and syndiotactic polymers are not. Preferred isotactic antifoamant polymers of the invention at a concentration of 1% in benzene have specific viscosities at 25° C. in the range of 0.2 to 10.0, more preferably in the range of about 0.5 to about 6.0.

Suitable antifoamants of the invention are also formed by copolymerizing methacrylate monomers with other monomers such as styrene, acrylonitrile, acrylate, vinyl acetate, etc. The same polymerization procedure is used to prepare these isotactic polymers with these miscellaneous monomers as is used to prepare the isotactic methacrylate polymers. The amounts of these other monomers should be restricted to not more than 15% by weight, 6. A composition of claim 2 wherein said polymethacrylate is poly(n-octyl methacrylate).

7. A composition of claim 2 wherein said polymethacrylate is poly(lauryl methacrylate/methyl methacrylate) in 50/50 molar ratio, respectively.

References Cited
UNITED STATES PATENTS 2,655,479  10/1953  Munday et al. _____ 252—56
3,166,508  1/1965   Fields _____ 44—70 X
3,192,165  6/1965   Fields et al. _____ 252—56
3,252,949  5/1966   Fields et al. _____ 252—56 X DANIEL E. WYMAN, *Primary Examiner.*

W. H. CANNON, *Examiner.*